(12) United States Patent
Wu et al.

(10) Patent No.: US 11,346,789 B2
(45) Date of Patent: May 31, 2022

(54) OPTICAL INSPECTION SYSTEM

(71) Applicant: MPI CORPORATION, Chu-Pei (TW)

(72) Inventors: Ping-Ying Wu, Chu-Pei (TW);
Chiu-Wang Chen, Chu-Pei (TW);
Yung-Chin Liu, Chu-Pei (TW)

(73) Assignee: MPI CORPORATION, Chu-Pei (TW)

( * ) Notice: Subject to any disclaimer, the term of this patent is extended or adjusted under 35 U.S.C. 154(b) by 0 days.

(21) Appl. No.: 17/117,477

(22) Filed: Dec. 10, 2020

(65) Prior Publication Data

US 2021/0181120 A1   Jun. 17, 2021

Related U.S. Application Data

(60) Provisional application No. 62/948,186, filed on Dec. 13, 2019.

(30) Foreign Application Priority Data

Sep. 28, 2020   (TW) ................... 109133671

(51) Int. Cl.
*G01N 21/88* (2006.01)

(52) U.S. Cl.
CPC ..... *G01N 21/8806* (2013.01); *G01N 21/8851* (2013.01); *G01N 2021/8887* (2013.01)

(58) Field of Classification Search
CPC .......... G01N 21/8806; G01N 21/8851; G01N 2021/8887
See application file for complete search history.

(56) References Cited

U.S. PATENT DOCUMENTS

| 5,204,739 A | * | 4/1993 | Domenicali | .......... G03F 9/7069 348/79 |
| 5,995,282 A | * | 11/1999 | Akiyama | ............... A61B 90/20 359/384 |
| 2017/0322019 A1 | * | 11/2017 | Takushima | .............. G01S 17/08 |

FOREIGN PATENT DOCUMENTS

| CN | 1766531 A | 5/2006 | |
| CN | 201993440 U | * 9/2011 | ............ G01M 11/00 |
| JP | 3784030 B2 | * 6/2006 | ................ G01B 9/02 |

* cited by examiner

*Primary Examiner* — Jamil Ahmed
(74) *Attorney, Agent, or Firm* — Birch, Stewart, Kolasch & Birch, LLP

(57) ABSTRACT

An optical inspection system includes a brightness inspection module for inspecting the brightness of a light emitting element, an integrated inspection module for inspecting the near field optical characteristic and the beam quality factor of the light emitting element, and a far field inspection module for inspecting the far field optical characteristic of the light emitting element. As a result, the optical inspection system is space-saving and capable of reducing the distance and time of the movement of the device under test.

11 Claims, 6 Drawing Sheets

OPTICAL INSPECTION SYSTEM

CROSS REFERENCE TO RELATED APPLICATIONS

This non-provisional application claims the benefit under 35 U.S.C. § 119(e) to U.S. Provisional Application No. 62/948,186, filed on Dec. 13, 2019, and under 35 U.S.C. § 119(a) to Patent Application No. 109133671, filed in Taiwan on Sep. 28, 2020, all of which are hereby expressly incorporated by reference into the present application.

BACKGROUND OF THE INVENTION

1. Field of the Invention

The present invention relates generally to inspection systems for inspecting electronic components and more particularly, to an optical inspection system for inspecting a light emitting element.

2. Description of the Related Art

The traditional optical inspection system is primarily adapted to inspect the brightness of a device under test by an optical integrating sphere. However, for some specific devices under test, such as vertical-cavity surface-emitting laser array chip (also referred to as 'VCSEL chip' hereinafter), an M-Square ($M^2$; also referred to as 'beam quality factor' hereinafter) inspection is needed additionally. If an $M^2$ inspecting station is directly added to the original optical inspection system, even though it can achieve the inspecting purpose, it will increase the overall volume of the system, reduce the space utilizing efficiency, and increase the distance and time, for which the device under test should be moved between the inspecting stations. Therefore, the optical inspection system having the $M^2$ inspecting function for such element as VCSEL chip is still to be developed.

SUMMARY OF THE INVENTION

The present invention has been accomplished in view of the above-noted circumstances. It is an objective of the present invention to provide an optical inspection system which is capable of performing the optical inspection for beam quality factor ($M^2$), space-saving, and capable of reducing the distance and time of the movement of the device under test.

To attain the above objective, the present invention provides an optical inspection system which includes a brightness inspection module, e.g. LIV (light-current-voltage) inspection module, for inspecting the brightness of a light emitting element, an integrated inspection module for inspecting the near field optical characteristic and the beam quality factor of the light emitting element, and a far field inspection module for inspecting the far field optical characteristic of the light emitting element.

As a result, the optical inspection system of the present invention integrates the near field optical inspection and the beam quality factor ($M^2$) optical inspection in a single module, i.e. the integrated inspection module, enabling the near field optical inspection and the beam quality factor ($M^2$) optical inspection to be performed to the light emitting element in the same inspecting station successively (unlimited in sequence), thereby space-saving and capable of reducing the distance and time of the movement of the device under test. Further speaking, in the integrated inspection module, an optical inspection device including an image capturing unit may be disposed on a first displacement device in a way that the first displacement device can drive the optical inspection device to move linearly along an imaginary adjustment axis (e.g. vertical axis) in a relatively larger movement range. Besides, the image capturing unit is disposed on a second displacement device, which is also driven by the first displacement device, in a way that the second displacement device can drive the image capturing unit to move linearly along the imaginary adjustment axis in a relatively smaller movement range. In this way, the near field optical inspection and the beam quality factor ($M^2$) optical inspection can be performed by using the first displacement device to perform a displacement control of a large range (rough adjustment) to the image capturing unit and using the second displacement device to perform a displacement control of a small range (fine adjustment) to the image capturing unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
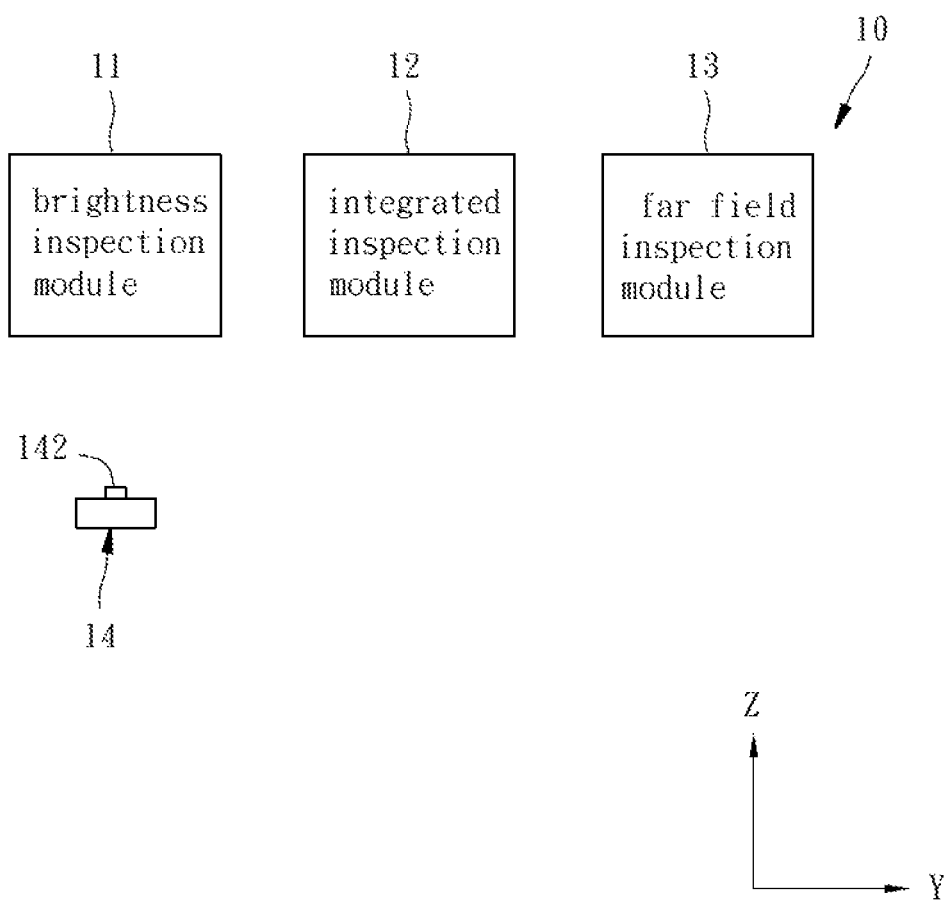
FIG. 1 is a schematic view of an optical inspection system and a device under test according to a first preferred embodiment of the present invention.

First of all, it is to be mentioned that same or similar reference numerals used in the following embodiments and the appendix drawings designate same or similar elements or the structural features thereof throughout the specification for the purpose of concise illustration of the present invention. It should be noticed that for the convenience of illustration, the components and the structure shown in the figures are not drawn according to the real scale and amount, and the features mentioned in each embodiment can be applied in the other embodiments if the application is possible in practice. Besides, when it is mentioned that an element is disposed on another element, it means that the former element is directly disposed on the latter element, or the former element is indirectly disposed on the latter element through one or more other elements between aforesaid former and latter elements. When it is mentioned that an element is directly disposed on another element, it means that no other element is disposed between aforesaid former and latter elements.

Referring to FIG. 1, an optical inspection system 10 according to a first preferred embodiment of the present invention includes a brightness inspection module 11, an integrated inspection module 12, and a far field inspection module 13, which are unlimited to be arranged in the positional sequence as shown in FIG. 1. The optical inspection system 10 is adapted for inspecting the optical characteristics of a light emitting element 142 (e.g. VCSEL chip; unlimited in amount) of a device under test 14. The device under test 14 is practically disposed on a movement platform (not shown) and hence movable along an imaginary movement axis (Y-axis) to be inspected by the modules 11, 12 and 13 in order.

The brightness inspection module 11 is adapted for inspecting the brightness of the light emitting element 142, for example, which may be an LIV inspection module for measuring the light brightness-current-voltage curve of the light emitting element 142. The far field inspection module 13 is adapted for inspecting the far field optical characteristic of the light emitting element 142. The integrated inspection module 12 is adapted for inspecting the near field optical characteristic and beam quality factor ($M^2$) of the light emitting element 142, which means after the device under test 14 is moved along the Y-axis to the position below the integrated inspection module 12, the near field optical inspection and the $M^2$ optical inspection can be performed to the device under test 14 successively (unlimited in sequence) without requiring the device under test 14 to move along the Y-axis anymore, the details of which will be described hereunder.

Figure 2:
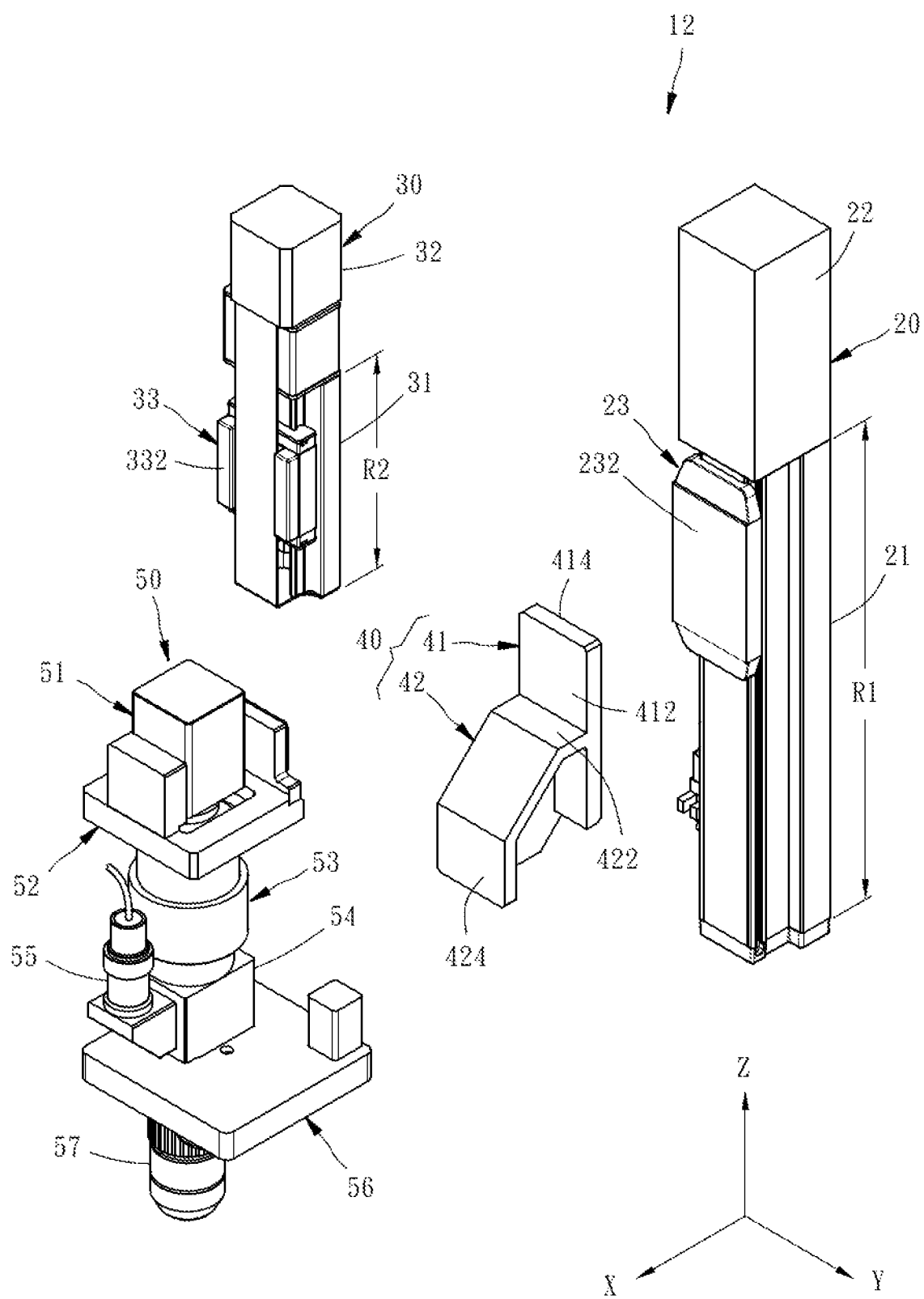
FIG. 2 is an exploded perspective view of an integrated inspection module of the optical inspection system according to the first preferred embodiment of the present invention.
Figure 3:
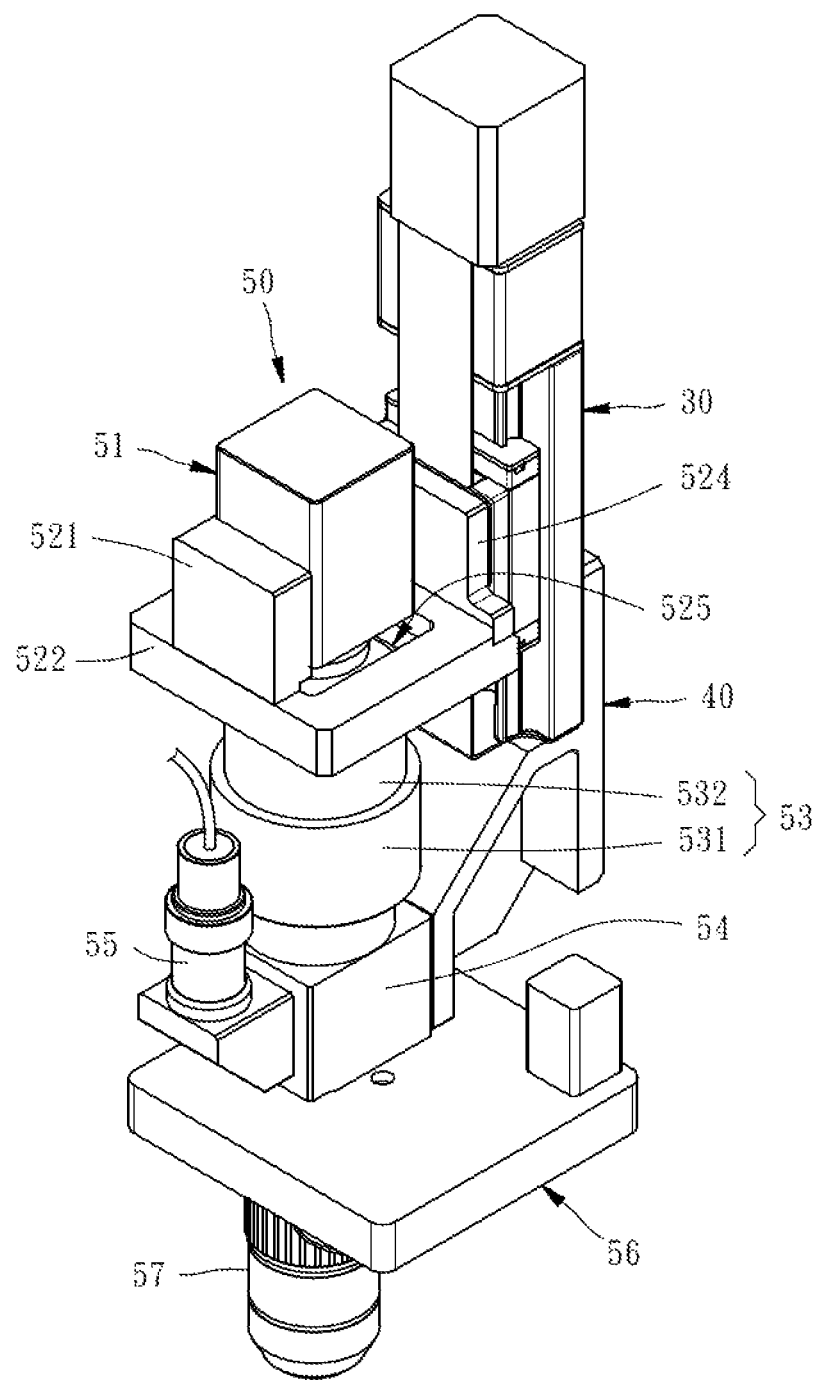
FIG. 3 is an assembled perspective view of an optical inspection device, a second displacement device and an installation seat of the integrated inspection module.

Referring to FIG. 2 and FIG. 3, the integrated inspection module 12 includes a first displacement device 20, a second displacement device 30, an installation seat 40, and an optical inspection device 50.

The first displacement device 20 and the second displacement device 30 may be the conventional electric slide assembly primarily including a slide base 21 or 31, a motor 22 or 32 (e.g. step motor) disposed on an end of the slide base 21 or 31, and a sliding seat 23 or 33 disposed on the slide base 21 or 31 capably of being driven by the motor 22 or 32 to move along an imaginary adjustment axis (Z-axis). Each of the sliding seats 23 and 33 has an installation surface 232 or 332 parallel to the Y-axis and Z-axis.

The installation seat 40 has a base portion 41, and an extending portion 42 extending from a front surface 412 of the base portion 41, which is parallel to the Y-axis and Z-axis. A rear surface 414 of the base portion 41, which is parallel to the Y-axis and Z-axis, is fastened to the installation surface 232 of the sliding seat 23 of the first displacement device 20 by screws. The slide base 31 of the second displacement device 30 is fastened to the front surface 412 of the base portion 41 of the installation seat 40 and a top surface 422 of the extending portion 42 by screws, which means the second displacement device 30 is disposed on the sliding seat 23 of the first displacement device 20 through the installation seat 40.

The optical inspection device 50 includes an image capturing unit 51, a retaining unit 52, a first objective lens 53, a light guiding unit 54, a light source unit 55, a light reducing unit 56, and a second objective lens 57.

The image capturing unit 51 may be a camera whose photosensitive element is a charge-coupled device (also referred to as 'CCD' hereinafter) or complementary metal-oxide-semiconductor (also referred to as 'CMOS' hereinafter). The image capturing unit 51 is fixed by a screw-fastening way to the installation surface 332 of the sliding seat 33 of the second displacement device 30 through a front vertical plate 521, a bottom plate 522 and a rear vertical plate 524 of the retaining unit 52.

The first objective lens 53 includes an outer sleeve 531, and an inner sleeve 532 disposed in the outer sleeve 531 and movable relative to the outer sleeve 531. The outer sleeve 531 and the inner sleeve 532 are provided therein with optical lenses (not shown). The top end of the inner sleeve 532 is inserted through a through hole 525 of the retaining unit 52, which penetrates through the bottom plate 522 of the retaining unit 52, and fixed to the bottom end of the image capturing unit 51.

The light guiding unit 54 is fixed to the bottom end of the outer sleeve 531 of the first objective lens 53 and fastened to a front surface 424 of the extending portion 42 of the installation seat 40 by screws. The light source unit 55 is connected to a lateral surface of the light guiding unit 54. The light guiding unit 54 is provided therein with light guiding members (not shown). The light source unit 55 is provided therein with a light source (not shown). The light emitted by the light source is guided by the light guiding members inside the light guiding unit 54, so as to provide the light required for the image capturing unit 51 to focus on the light emitting element 142 under test along the Z-axis and recognize the X-Y-axial position of the light emitting element 142.

The light reducing unit 56 is connected to the bottom of the light guiding unit 54 for optionally providing light reducing effect, the details of which will be described hereunder. The second objective lens 57 is connected to the bottom of the light reducing unit 56. The second objective lens 57 is provided therein with an optical lens (not shown). The image capturing unit 51 captures the image of the light emitting element 142 disposed below the second objective lens 57 through the first objective lens 53, the light guiding unit 54, the light reducing unit 56 and the second objective lens 57 in order.

Figure 4:
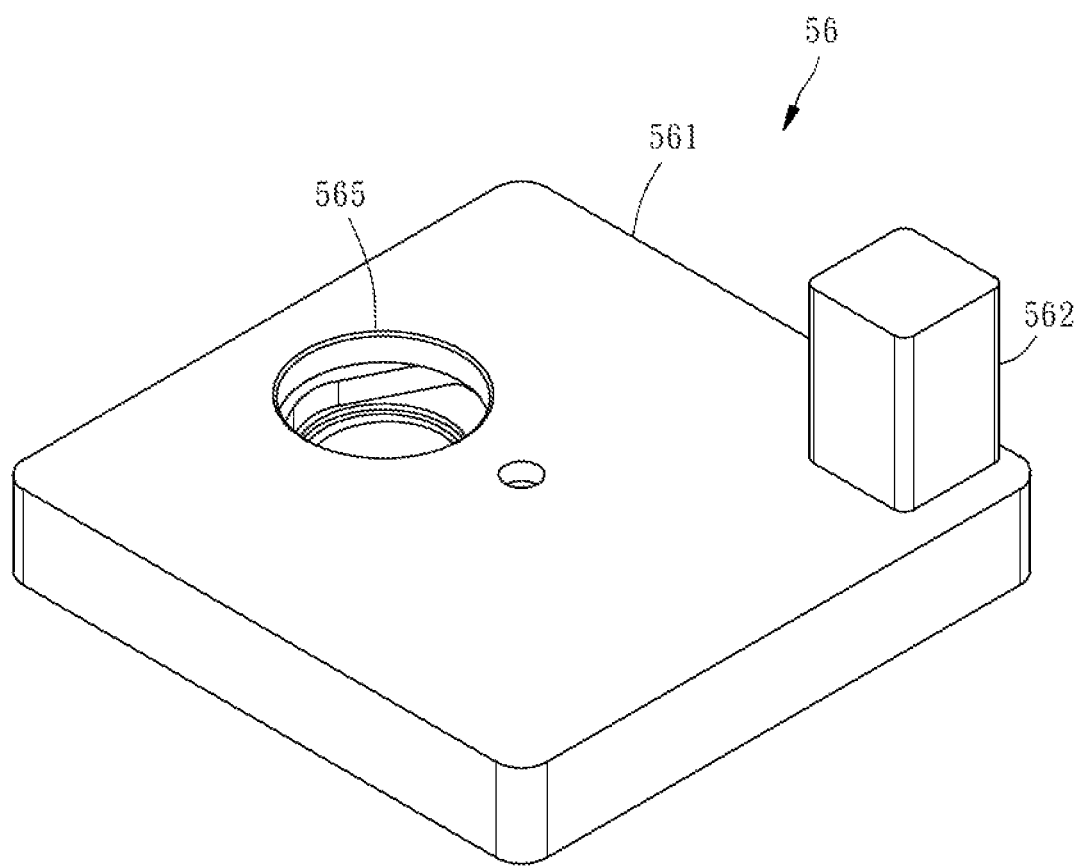
FIG. 4 is an assembled perspective view of a light reducing unit of the optical inspection device.
Figure 5:
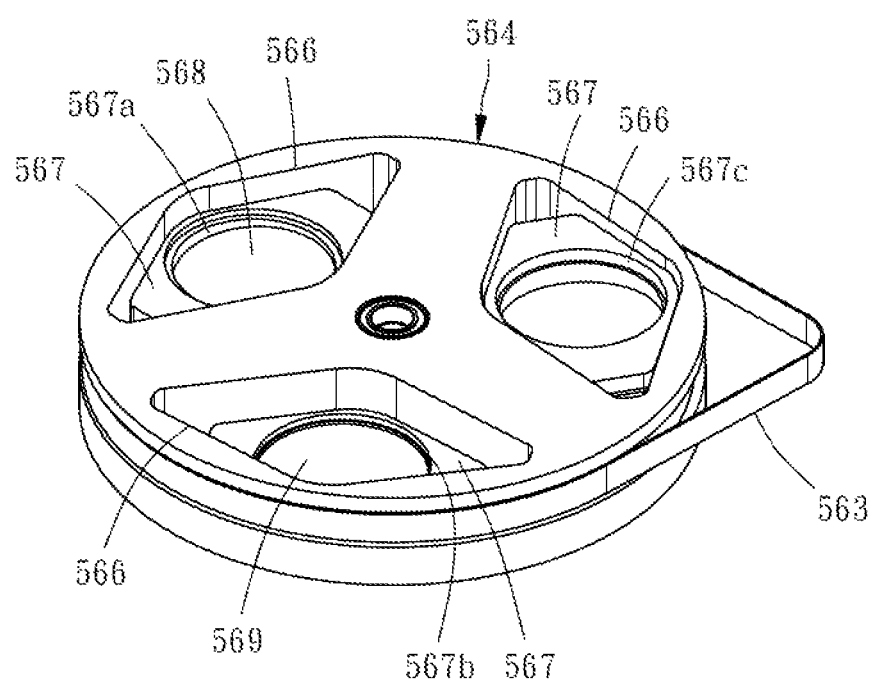
FIG. 5 is an assembled perspective view of an inner structure of the light reducing unit.

Referring to FIG. 4 and FIG. 5, the light reducing unit 56 primarily includes a main body 561, a drive 562 (e.g. motor) disposed on the top of the main body 561, and a transmission member 563 (e.g. belt, or gear train) and a rotary member 564, which are disposed inside the main body 561. Through the transmission member 563, the drive 562 drives the rotary member 564 to rotate relative to the main body 561. The main body 561 has a through hole 565 communicating with the light guiding unit 54 and corresponding in position to the image capturing unit 51. The rotary member 564 has three through holes 566, and three displacement members 567 disposed in the three through holes 566 respectively by a screw-fastening way. The three displacement members 567 have installation troughs 567a, 567b and 567c respectively, wherein the installation troughs 567a and 567b are respectively provided therein with two light reducing members 568 and 569 of different light reducing effects, e.g. ND (neutral density) filters, and the installation trough 567c is provided therein without any element. The rotary member 564 can be driven by the drive 562 to selectively rotate anyone of the three installation troughs 567a, 567b and 567c to the position corresponding to the through hole 565. Therefore, each of the light reducing members 568 and 569 can be moved by the rotary member 564 to the position corresponding to the through hole 565 in alignment with the image capturing unit 51, such that the light emitted by the light emitting element 142 under test is reduced by the light reducing member 568 or 569 before being guided to the first objective lens 53 and the image capturing unit 51 by the light guiding unit 56, so as to avoid indistinct image due to overexposure which occurs when the image capturing unit 51 captures the image. Alternately, the light reducing unit 56 can make the installation trough 567c without any light reducing member correspond in position to the image capturing unit 51, so as to not provide any light reducing effect when the image capturing unit 51 focuses on the light emitting element 142 under test along the Z-axis and recognize the X-Y-axial position of the light emitting element 142.

It can be known from the above description that the second displacement device 30 and the optical inspection device 50 are disposed on the sliding seat 23 of the first displacement device 20 through the installation seat 40. Therefore, the first displacement device 20 can drive the second displacement device 30 and the optical inspection device 50 at the same time to move them together along the imaginary adjustment axis (Z-axis) in a first movement range R1 as shown in FIG. 2. Besides, the image capturing unit 51 of the optical inspection device 50, the retaining unit 52, and the inner sleeve 532 of the first objective lens 53 are fixed to each other and fixed to the sliding seat 33 of the second displacement device 30. Therefore, the second displacement device 30 can drive the image capturing unit 51, the retaining unit 52 and the inner sleeve 532 of the first objective lens 53 at the same time to move them together along the imaginary adjustment axis (Z-axis) in a second movement range R2 smaller than the first movement range R1. In other words, when the sliding seat 33 of the second displacement device 30 moves, the inner sleeve 532 of the first objective lens 53 is driven by the sliding seat 33 to move relative to the outer sleeve 531.

As a result, the first displacement device 20 can drive the entire optical inspection device 50 to move along the imaginary adjustment axis (Z-axis) for focusing the image capturing unit 51 on the light emitting element 142 in every time of inspecting the light emitting element 142, and the second displacement device 30 can also drive the image capturing unit 51 to move relative to the light guiding, light source and light reducing units 54, 55 and 56 and the second objective lens 57 along the imaginary adjustment axis (Z-axis) to fine-tune the focus. In the above-described process of focusing the image capturing unit 51, the light source unit 55 emits light and provides the light required for the image capturing unit 51 to focus on light emitting element 142 through the light guiding unit 54, and the light reducing unit 56 positions the installation trough 567c without any light reducing member correspondingly to the image capturing unit 51, thereby not providing any light reducing effect. After the focus is done, the image capturing unit 51 captures the image of the light emitting element 142 when it emits light, for performing the near field optical inspection to the light emitting element 142. At the same time, the light reducing unit 56 can selectively position the light reducing member 568 or 569 correspondingly to the image capturing unit 51 to provide light reducing effect. Besides, when the light emitting element 142 emits light and is inspected, the second displacement device 30 can also drive the image capturing unit 51 to move along the imaginary adjustment axis (Z-axis) in a small range to scan and continuously capture the images of the light emitting element 142, for performing the $M^2$ optical inspection to the light emitting element 142. For example, the sliding seat 33 of the second displacement device 30 may start to drive the image capturing unit 51 from the middle of the slide base 31 to firstly move and scan downward and then move and scan upward. In other words, the optical inspection system 10 of the present invention integrates the near field optical inspection and the $M^2$ optical inspection in the same module, i.e. the integrated inspection module 12, enabling the near field optical inspection and the $M^2$ optical inspection to be performed to the light emitting element 142 in the same inspecting station successively (unlimited in sequence), thereby space-saving and capable of reducing the distance and time of the movement of the device under test 14.

Figure 6:
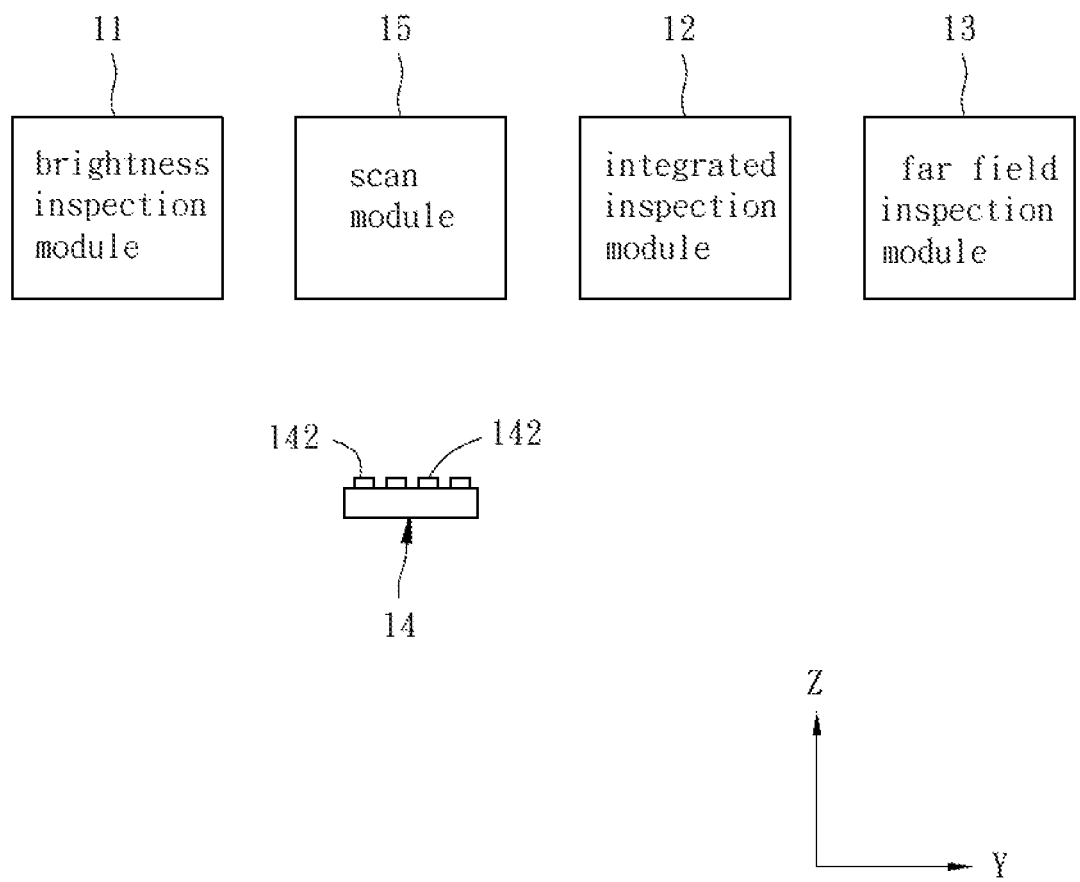
FIG. 6 is a schematic view of an optical inspection system and a device under test according to a second preferred embodiment of the present invention.

As a second preferred embodiment of the present invention as shown in FIG. 6, the optical inspection system 10 of the present invention may further include a scan module 15. As described above, the amount of the light emitting elements 142 of the device under test 14 is unlimited, which means the device under test 14 may be provided thereon with a plurality of light emitting elements 142. The scan module 15 is adapted to scan the device under test 14 to obtain the positional coordinate of each light emitting element 142 on the device under test 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical inspection system comprising:
   a brightness inspection module for inspecting brightness of a light emitting element;
   an integrated inspection module for inspecting a near field optical characteristic and a beam quality factor of the light emitting element; and
   a far field inspection module for inspecting a far field optical characteristic of the light emitting element;
   wherein the integrated inspection module comprises a first displacement device, a second displacement device disposed on the first displacement device, and an image capturing unit disposed on the second displacement device; the first displacement device drives the image capturing unit and the second displacement device to simultaneously move along an imaginary adjustment axis in a first movement range; the second displacement device drives the image capturing unit to move along the imaginary adjustment axis in a second movement range; the second movement range is smaller than the first movement range;
   wherein the integrated inspection module further comprises a first objective lens which comprises an outer sleeve and an inner sleeve disposed in the outer sleeve; the inner sleeve is fixed to the image capturing unit and driven by the second displacement device to move relative to the outer sleeve; and
   wherein the first displacement device comprises a sliding seat movable along the imaginary adjustment axis; the integrated inspection module further comprises an installation seat fixed to the sliding seat, a light guiding unit fixed to the outer sleeve of the first objective lens and the installation seat, and a light source unit connected to the light guiding unit the second displacement device is disposed on the installation seat.

2. The optical inspection system as claimed in claim 1, wherein the integrated inspection module further comprises a light reducing unit which comprises at least one light reducing member; the light reducing member is movable to a position corresponding to the image capturing unit.

3. The optical inspection system as claimed in claim 2, wherein the light reducing unit comprises a main body, and a rotary member rotatably disposed on the main body; the main body has a through hole corresponding in position to the image capturing unit; the light reducing member is disposed on the rotary member and moved by the rotary member to a position corresponding to the through hole.

4. The optical inspection system as claimed in claim 3, wherein the rotary member of the light reducing unit comprises three installation troughs selectively rotatable to the position corresponding to the through hole; one of the installation troughs is provided therein without said light reducing member, and the other two installation troughs are provided therein with two said light reducing members of different light reducing effects, respectively.

5. The optical inspection system as claimed in claim 2, wherein the integrated inspection module further comprises a second objective lens; the light reducing unit is disposed between the first objective lens and the second objective lens.

6. An optical inspection system comprising:
a brightness inspection module for inspecting brightness of a light emitting element;
an integrated inspection module for inspecting a near field optical characteristic and a beam quality factor of the light emitting element; and
a far field inspection module for inspecting a far field optical characteristic of the light emitting element;
wherein the integrated inspection module comprises a first displacement device, a second displacement device disposed on the first displacement device, and an optical inspection device; the optical inspection device comprises an image capturing unit disposed on the second displacement device; the first displacement device drives the image capturing unit and the second displacement device to simultaneously move along an imaginary adjustment axis to focus the image capturing unit on the light emitting element the second displacement device drives the image capturing unit to move along the imaginary adjustment axis so as to inspect the beam quality factor of the light emitting element;
wherein the integrated inspection module further comprises a first objective lens which comprises an outer sleeve and an inner sleeve disposed in the outer sleeve; the inner sleeve is fixed to the image capturing unit and driven by the second displacement device to move relative to the outer sleeve;
wherein the first displacement device comprises a sliding seat movable along the imaginary adjustment axis; the integrated inspection module further comprises an installation seat fixed to the sliding seat, a light guiding unit fixed to the outer sleeve of the first objective lens and the installation seat, and a light source unit connected to the light guiding unit; the second displacement device is disposed on the installation seat.

7. The optical inspection system as claimed in claim 6, wherein the integrated inspection module further comprises a light reducing unit which comprises at least one light reducing member; the light reducing member is movable to a position corresponding to the image capturing unit.

8. The optical inspection system as claimed in claim 7, wherein the light reducing unit comprises a main body, and a rotary member rotatably disposed on the main body; the main body has a through hole corresponding in position to the image capturing unit; the light reducing member is disposed on the rotary member and moved by the rotary member to a position corresponding to the through hole.

9. The optical inspection system as claimed in claim 8, wherein the rotary member of the light reducing unit comprises three installation troughs selectively rotatable to the position corresponding to the through hole; one of the installation troughs is provided therein without said light reducing member, and the other two installation troughs are provided therein with two said light reducing members of different light reducing effects, respectively.

10. The optical inspection system as claimed in claim 7, wherein the integrated inspection module further comprises a second objective lens; the light reducing unit is disposed between the first objective lens and the second objective lens.

11. The optical inspection system as claimed in claim 1, which further comprises a scan module for scanning a device under test to obtain a position of said light emitting element of the device under test.

* * * * *